United States Patent
Yang et al.

(10) Patent No.: US 10,365,511 B2
(45) Date of Patent: Jul. 30, 2019

(54) DISPLAY DEVICE WITH CONDUCTIVE WIRE AND LIGHT-SHIELDING PATTERN HAVING DIFFERENT CURVATURES

(71) Applicant: Innolux Corporation, Miao-Li County (TW)

(72) Inventors: Shun-Chen Yang, Miao-Li County (TW); Yu-Lun Hsu, Miao-Li County (TW); Chung-Wen Yen, Miao-Li County (TW); Chao-Hsiang Wang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/876,352

(22) Filed: Jan. 22, 2018

(65) Prior Publication Data
US 2018/0143489 A1    May 24, 2018

Related U.S. Application Data

(63) Continuation of application No. 14/476,774, filed on Sep. 4, 2014, now Pat. No. 9,910,311.

(30) Foreign Application Priority Data

Jul. 3, 2014   (TW) ............................. 103122938 A

(51) Int. Cl.
G02F 1/1335 (2006.01)
G02F 1/1362 (2006.01)

(52) U.S. Cl.
CPC .. G02F 1/133512 (2013.01); G02F 1/136286 (2013.01)

(58) Field of Classification Search
CPC ..................... G02F 1/133512; G02F 1/136286
(Continued)

(56) References Cited

U.S. PATENT DOCUMENTS 6,483,566 B2    11/2002  Youn et al.
9,594,272 B2 *   3/2017  Kajita ............... G02F 1/136209
(Continued)

FOREIGN PATENT DOCUMENTS

JP       2006267821 A    10/2006
KR    1020020012367 A     2/2002
(Continued)

OTHER PUBLICATIONS

TIPO Office Action dated Nov. 27, 2015 in corresponding Taiwan application (No. 103122938).
(Continued)

Primary Examiner — Nathanael R Briggs
Assistant Examiner — William D Peterson
(74) Attorney, Agent, or Firm — McClure, Qualey & Rodack, LLP

(57) ABSTRACT

A display device includes a first substrate, a second substrate, a display medium layer, and a light-shielding pattern. The second substrate includes a conductive wire. The display medium layer is disposed between the first substrate and the second substrate. The light-shielding pattern is disposed between the first substrate and the second substrate. The conductive wire is projected onto the first substrate along a first direction to obtain a projected line. The projected line includes a first border. The light-shielding pattern includes a first edge. The first edge includes a first curving rim. The first curving rim is adjacent to the first border.

7 Claims, 7 Drawing Sheets

(58) Field of Classification Search
USPC .................................................. 349/110, 106
See application file for complete search history.

(56) References Cited

U.S. PATENT DOCUMENTS

2003/0043327 A1\*  3/2003  Aoyama ........... G02F 1/134363
                                                    349/141
2010/0066933 A1    3/2010  Oh et al.

FOREIGN PATENT DOCUMENTS

KR    1020050119271 A    12/2005
KR    1020100031977 A     3/2010
TW          594123 B      6/2004

OTHER PUBLICATIONS

KIPO Office Action dated Jan. 21, 2016 in corresponding Korean application (No. 10-2015-0018008).

\* cited by examiner

DISPLAY DEVICE WITH CONDUCTIVE WIRE AND LIGHT-SHIELDING PATTERN HAVING DIFFERENT CURVATURES

This application is a continuation application of co-pending Application No. 14/476,774, filed on Sep. 4, 2014, now U.S. Pat. No. 9,910,311, which claims the benefit of Taiwan application Serial No. 103122938, filed Jul. 3, 2014, the subject matter of which is incorporated herein by reference.

BACKGROUND

Field of the Invention

The disclosure relates in general to a display device, and more particularly to a display device with conductive wire and light-shielding pattern having different curvatures.

Description of the Related Art

Today, electronic products with displays, such as smart phones, tablet personal computers (i.e. tablet PC, flat PC, ex: iPad), laptops, monitors, and televisions, are necessary tools for work and leisure in the daily life. Liquid crystal display (LCD) is the most popular display in use. LCD possesses the excellent characteristics such as compact in size, light weight, easy to carry, having reasonable price, higher display quality and operation reliability. Also, viewer's eyes feel much more comfortable looking at a LCD. Older cathode ray tube (CRT) monitors have been replaced by LCDs. Currently, LCDs provide a versatile choice in sizes, shapes and resolutions for the consumer.

The important factors for manufacturing a qualified LCD includes not only the details in procedures such as accurate patterning steps (ex: lithography and etch) without breaking conductive traces, but also the electrical performances such as the resistance, capacitance meeting the requirements of the product, thereby producing the display with good reliability. The faulty design of the display will lead to the decreases of the yield and reliability of production.

SUMMARY

The disclosure is directed to a display device having a particular design of conductive wires, and the display device comprises the conductive wires and the light-shielding pattern having corresponding curved portions with different curving tendencies. More specifically, the display device for example can be a liquid crystal display. In one embodiment, the opposite sides of the curved portion of the conductive wire have different curvatures. When a voltage is applied to the LCD, more LC molecules corresponding to the side with less curving tendency (ex: gentle curving-inward side) rotate, thereby increasing the brightness of the LCD and improving the display quality of the product in the application. Although more LC molecules at the areas behind the gentle curving-inward side of the curving portion are twisted with large angle so as to increase the brightness of those areas, the increase of horizontal component of alignment also leads to the inconsistence of alignment directions of the LC molecules; therefore, the press stability of the area behind the gentle curving-inward side is poor. When the area with poor press stability of LCD is touched by the finger or any exterior object, the region of dark fringes become larger, so that the rotation of the LC molecules at this region are fixed and can not be well controlled by the electric field during the operation. Thus, the areas with poor press stability can be shielded by the light-shielding pattern of the embodiment in the practical application.

According to one embodiment of the disclosure, a display device is provided, comprising a first substrate, a second substrate, a display medium layer, and a light-shielding pattern. The second substrate comprises a conductive wire. The display medium layer is disposed between the first substrate and the second substrate. The light-shielding pattern is disposed between the first substrate and the second substrate. The conductive wire is projected onto the first substrate along a first direction to obtain a projected line. The projected line comprises a first border. The light-shielding pattern comprises a first edge. The first edge comprises a first curving rim. The first curving rim is adjacent to the first border.

The above and other aspects of the disclosure will become better understood with regard to the following detailed description of the preferred but non-limiting embodiments. The following description is made with reference to the accompanying drawings.

DETAILED DESCRIPTION

Figure 1:
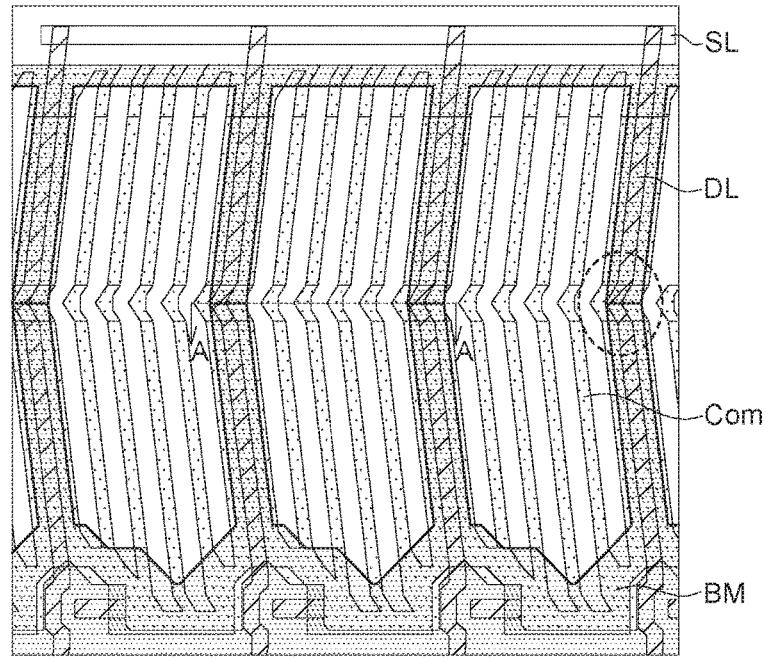
FIG. 1 is a top view of a FFS mode LCD according to the first embodiment of the present disclosure.

In the embodiment of the present disclosure, a display device for example a liquid crystal display (LCD) is disclosed by providing the particular design of conductive wires, and the opposite sides of the curved portion of the conductive wire (such as the electrode) have different curvatures. In one embodiment, a curved portion of an electrode comprises a convex border and a concave border opposite to the convex border, and a curving tendency of the concave border is smaller than a curving tendency of the convex border; for example, the concave border is an arced border. When a voltage is applied to the LCD, more LC molecules corresponding to the concave border rotate, thereby increasing the brightness of the LCD. The embodiment of the present disclosure can be widely used in various applications, such as applied to a FFS (fringe filed switching) mode LCD.

The embodiments are described in details with reference to the accompanying drawings. It is noted that the details of the structures of the embodiments are provided for exemplification, and the described details of the embodiments are not intended to limit the present disclosure. The identical and/or similar elements of the embodiments are designated with the same and/or similar reference numerals. It is noted that not all embodiments of the invention are shown. Modifications and variations can be made without departing from the spirit of the disclosure to meet the requirements of the practical applications. Thus, there may be other embodiments of the present disclosure which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense.

Figure 2:
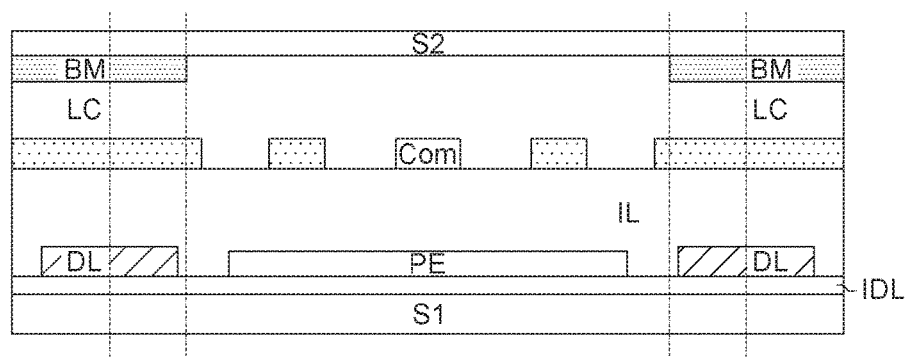
FIG. 2 is a cross-sectional view of a LCD taken along the cross-sectional line A-A of FIG. 1, which merely depicts relative positions of data lines, the pixel electrode PE, the common electrode Com and a light-shielding pattern BM.

FIG. 1 is a top view of a FFS (fringe filed switching) mode LCD according to the first embodiment of the present disclosure. FIG. 2 is a cross-sectional view of a LCD taken along the cross-sectional line A-A of FIG. 1, which merely depicts relative positions of data lines DL, the pixel electrode PE, the common electrode Com and a light-shielding pattern BM. Please refer to FIG. 1 and FIG. 2. The common electrode Corn, such as a patterned ITO, is disposed above the pixel electrode PE, and an insulating layer IL is formed between the common electrode Com and the pixel electrode PE. An interlayer dielectric layer IDL is further formed under the pixel electrode PE, and a lower substrate S1 is positioned beneath the interlayer dielectric layer IDL. The pixel electrode PE is a full conductive plate, while the common electrode Com is a patterned conductive plate. LC molecules are twisted along the field direction of the electric field generated between the common electrode Com and the pixel electrode PE. A light-shielding pattern (such as black matrix) BM is formed on an upper substrate S2 for separating different color resists, and is also positioned right above the data lines DL for shielding the data lines DL. FIG. 2 shows one structure of the FFS mode LCDs according to the embodiment. An alternative structure of the FFS mode LCD according to the embodiment is setting the pixel electrode PE above the common electrode Com, wherein the pixel electrode PE is a patterned conductive plate and the common electrode Com is a full conductive plate, and a planarization layer and an interlayer dielectric layer IDL are disposed beneath the pixel electrode PE. It is noted that the embodiments of the disclosure can be applied to any type of structures of the FFS mode LCDs.

In the first structure of the FFS mode LCDs, as shown in FIG. 2, the shape of the common electrode Com is determined based on the generated optical effect of the LCD. One of the shapes of the common electrode Com of the embodiment is shown in FIG. 1, which depicts the common electrode corresponding to plural sub-pixels. The patterned common electrode comprises plural chevron-shaped electrodes, and each of the chevron-shaped electrodes has a bending portion with a curving-inward side and a curving-outward side opposite to the curving-inward side. Every sub-pixel are is divided into two parts by the bending portion, and two different aligning liquid crystal domains are created to provide wide-viewing angle effect of the LCD. However, the bending portion is positioned correspondingly to the boundary at different aligning LC domains, so that the liquid crystal molecules near the bending portion are more disordered than the liquid crystal molecules at the other portions. Therefore, defects of dark fringes would be easily occurred when the pixels are in a white state (ex: a voltage is applied).

Accordingly, several simulation tests are conducted to investigate effects of the electrode designs on the brightness distribution. Results of one set of simulation tests are provided below. It is noted that the electrode design and the gray scales of the simulation tests are not listed for limitation but for exemplification; and also, those are not the best results of the LCD applied by the disclosure can be achieved.

Figure 3A:
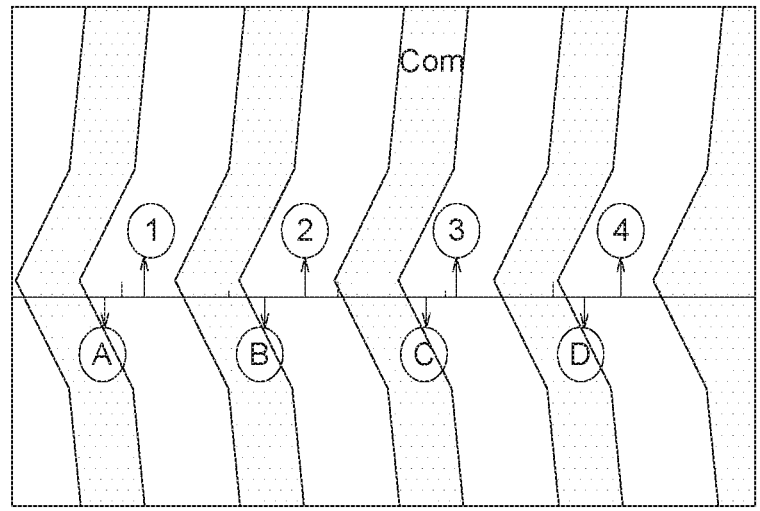
FIG. 3A illustrates a pattern of the common electrode of the simulation test according to the first embodiment of the disclosure.
Figure 3B:
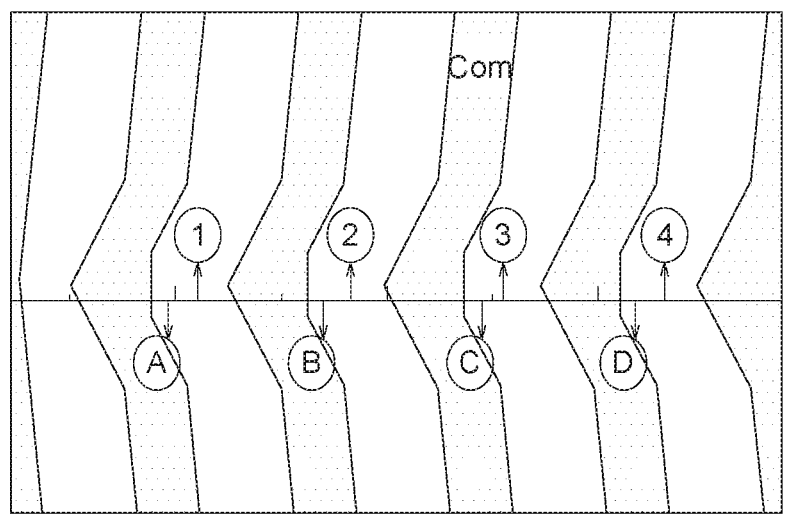
FIG. 3B illustrates a pattern of the common electrode of the simulation test according to the second embodiment of the disclosure.
Figure 3C:
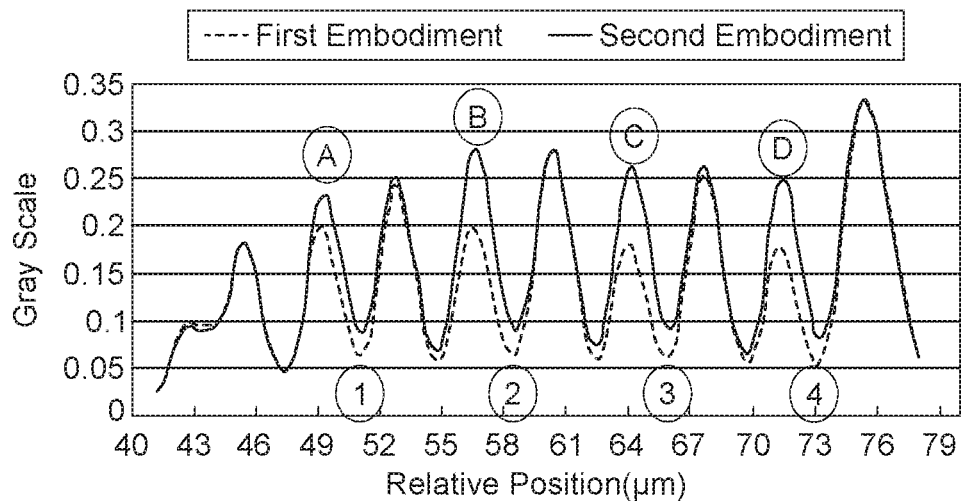
FIG. 3C shows the distributions of the gray scales and relative positions according to the common electrodes of the first and second embodiments of the disclosure.

Please refer to FIG. 3A-FIG. 3C and Table 1. FIG. 3A illustrates a pattern of the common electrode (Com) of the simulation test according to the first embodiment of the disclosure. FIG. 3B illustrates a pattern of the common electrode (Com) of the simulation test according to the second embodiment of the disclosure. FIG. 3C shows the distributions of the gray scales and relative positions according to the common electrodes of the first and second embodiments of the disclosure.

In this exemplified simulation test, the relative position A is a position of 49.25 μm to a reference point, the relative position B is a position of 56.5 μm to the reference point, the relative position C is a position of 64 μm to the reference point, and the relative position D is a position of 71.25 μm to the reference point.

In the pattern of common electrode of the second embodiment, the curving-inward sides (such as the relative positions A-D) of the bending portions are more gentle than the curving-outward sides, as shown in FIG. 3B. In the practical application, the curving-inward side of the bending portion of the common electrode can further comprise a straight line. In the pattern of common electrode of the first embodiment, both of the curving-inward sides and the curving-outward sides of the bending portions are formed of sharp lines, as shown in FIG. 3A. The relative positions 1~4 denote positions of the dark fringes having extremely low brightness, and the relative positions A-D denote positions of the bright fringes having higher brightness. Relationships between the gray scales and relative positions according to the common electrodes of the first and second embodiments are presented in FIG. 3C.

TABLE 1

| Relative position | Gray scale of the first embodiment | Gray scale of the second embodiment | Percentage of increase |
|---|---|---|---|
| A | 0.193 | 0.232 | 20% |
| B | 0.195 | 0.280 | 44% |
| C | 0.175 | 0.263 | 50% |
| D | 0.169 | 0.249 | 47% |

According to the simulation results of FIG. 3C and Table 1, it is clearly indicated that the gray scales (/brightness) of the same relative positions of the common electrode of the second embodiment have been significantly increased, wherein at least 20% (i.e. the relative position A) and up to 50% (i.e. the relative position C) of increase than that of the first embodiment can be achieved. Therefore, it has been proven that the brightness corresponding to the common electrode can be effectively increased by adopting the bending portion design having more gentle curving-inward side than the curving-outward side as disclosed by the second embodiment.

In the application of the embodiment, it is noted that other elements of structure can be modified and adjusted according to the applied electrode design and actual needs of the practical application. For example, if the electrode structure is designed to form the bending portions with the gentle curving-inward sides and the sharp curving-outward sides for the purpose of increasing the brightness, more LC molecules at the areas behind the gentle curving-inward sides of the bending portions are twisted with large angle due to the increase of horizontal component of alignment behind gentle curving-inward sides, thereby increasing the brightness of those areas. However, the increase of horizontal component of alignment also leads to the inconsistence of alignment directions of the LC molecules, so that the press stability of the area behind the gentle curving-inward side of the bending portion is poor. When the area with poor press stability of LCD is touched by the finger or any exterior object, the region of dark fringes become larger, so that the rotation of the LC molecules at this region are fixed and can not be well controlled by the electric field during the operation. Thus, it is appropriate to provide a light-shielding pattern capable of shielding the areas with poor press stability in the practical application.

Figure 4:
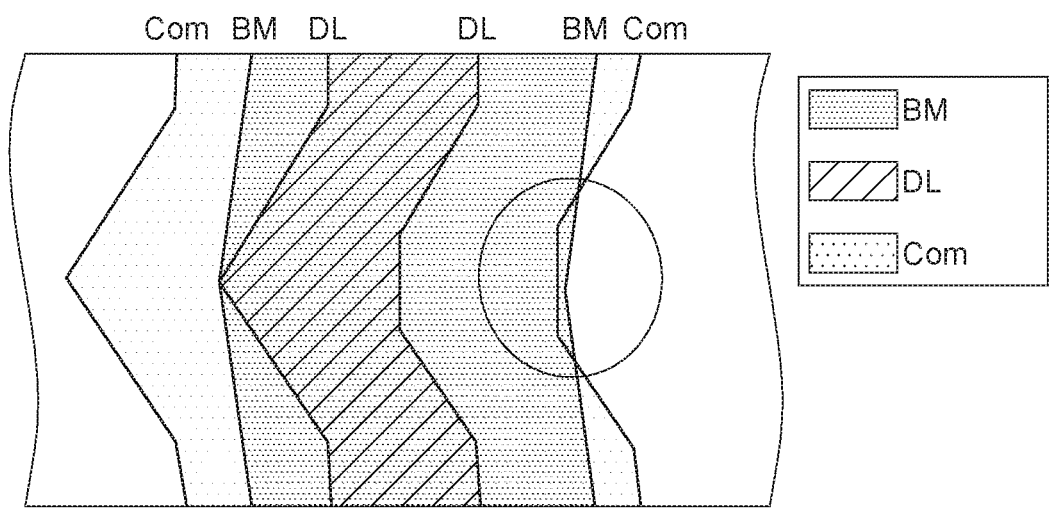
FIG. 4 is an enlarging drawing of the circling area of FIG. 1.

FIG. 4 is an enlarging drawing of the circling area of FIG. 1. As shown FIG. 4, when the common electrode Com is designed as the electrode structure of the embodiment of FIG. 3B, the gentle curving-inward side of the bending portion of the common electrode Com can increase the brightness, but also create the area with poor press stability (such as a circling area of FIG. 4). The area with poor press stability can be shielded by a light-shielding pattern (such as the black matrix, BM) to reduce the effect of the region of dark fringes on the displaying result. For example, the gentle curving-inward side of the bending portion of the ITO Com can be set within the light-shielding pattern BM, as shown in FIG. 4.

Figure 5:
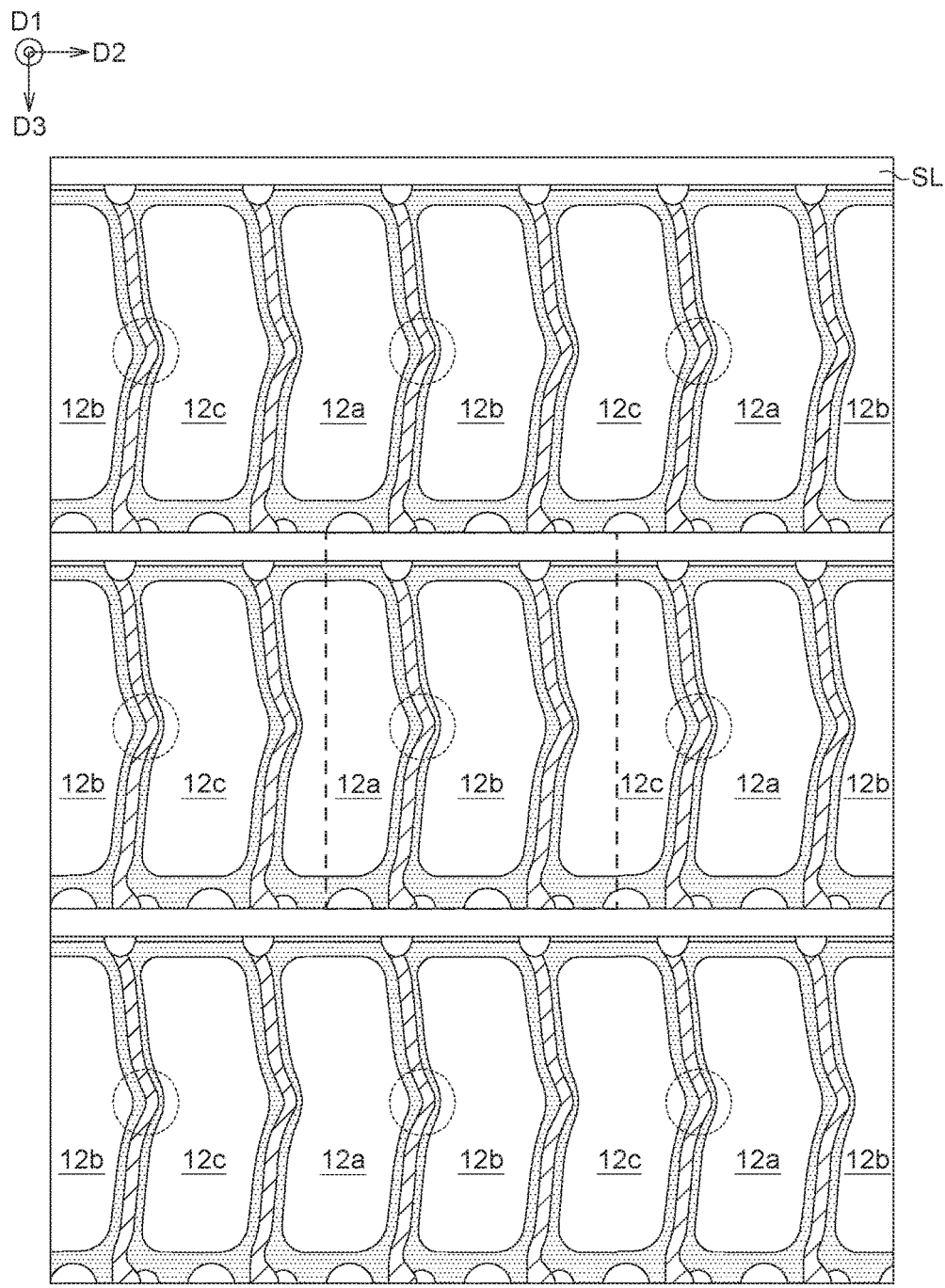
FIG. 5 is a top view of a display from the back side of a substrate, which illustrates the display having color resists, conductive wires and a light-shielding pattern according to one embodiment of the disclosure.
Figure 6:
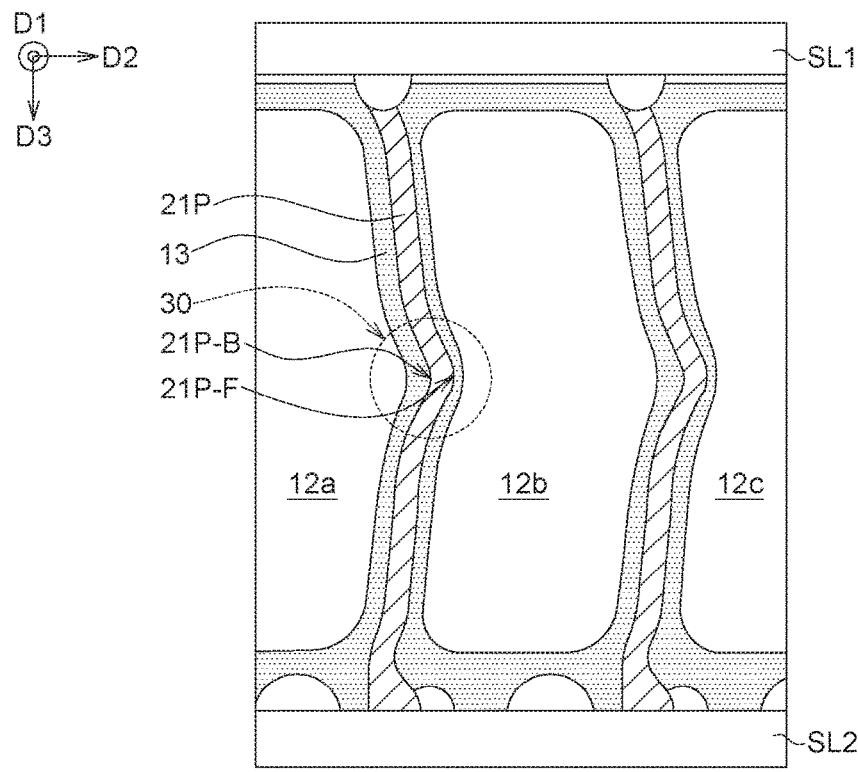
FIG. 6 is an enlarged view of the rectangular area denoted by the dashed lines of FIG. 5.
Figures 7A, 7B:
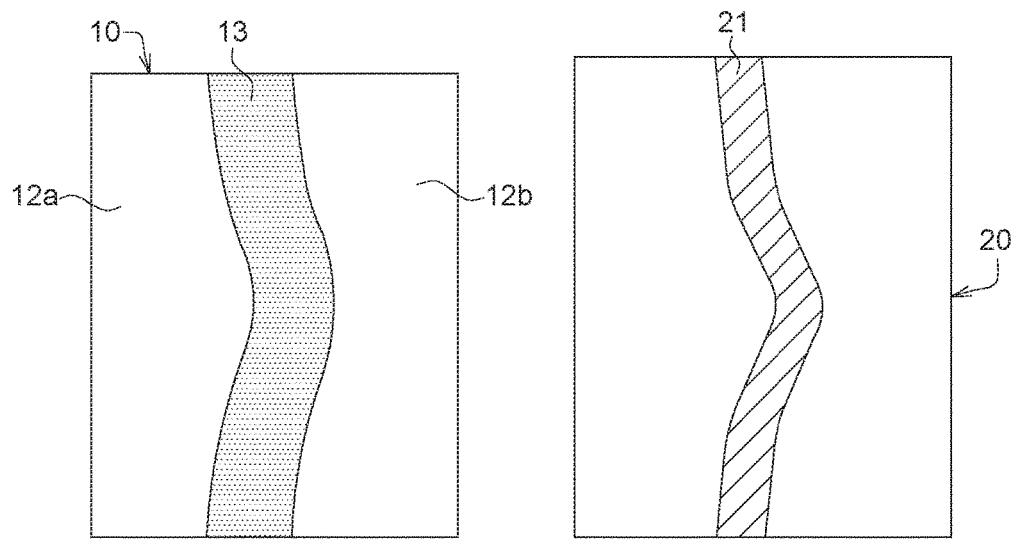
FIG. 7A depicts a first substrate corresponding to the curving potion in the circled area of FIG. 6.
FIG. 7B depicts a second substrate corresponding to the curving potion in the circled area of FIG. 6.

FIG. 5 is a top view of a display from the back side of a substrate, which illustrates the display having color resists, conductive wires and a light-shielding pattern according to one embodiment of the disclosure. FIG. 6 is an enlarged view of the rectangular area denoted by the dashed lines of FIG. 5. FIG. 7A depicts a first substrate corresponding to the curving potion in the circled area of FIG. 6. FIG. 7B depicts a second substrate corresponding to the curving potion in the circled area of FIG. 6. Please refer to FIG. 5, FIG. 6, FIG. 7A and FIG. 7B simultaneously. In the embodiment, a display comprises a first substrate 10, a second substrate 20, and a display medium layer such as a liquid crystal layer disposed between the first substrate 10 and the second substrate 20. The first substrate 10 and the second substrate 20 could be a TFT substrate and a CF substrate, respectively. The first substrate 10 may further comprise a color resist layer. In one embodiment, the color resist layer comprises a first color resist 12a (ex: green color resist), a second color resist 12b (ex: red color resist) and a third color resist 12c (ex: blue color resist). A light-shielding pattern 13, such as black matrix (BM), is positioned between the first substrate 10 and the second substrate 20. In this embodiment, the light-shielding pattern 13 is formed at the side of the first substrate 10, as shown in FIG. 7A.

The second substrate 20 opposite to the first substrate 10, and a plurality of conductive wires 21 are formed on the second substrate 20. In one embodiment, the conductive wires 21 are data lines. As shown in FIG. 6 and FIG. 7B, one of the conductive wires 21 is projected onto the light-shielding pattern 13 along a first direction D1 to obtain a projected line 21P within the light-shielding pattern 13. As shown in FIG. 5, the projected line 21P of the conductive wire 21 comprises a curved portion (such as the portion in the circled area 30 of FIG. 6), and the curving-inward side (i.e. the side 21P-B) of the curved portion is more gentle than the curving-outward side (i.e. the side 21P-F). Also, the conductive wire 21 can comprise scan lines, and at least one of the scan lines is projected onto the first substrate 10 along the first direction D1 to obtain a projected line extending along a second direction D2. As shown in FIG. 5, if those conductive wire 21 are data lines, the data lines are mainly extended along a third direction D3, wherein the third direction D3 is substantially perpendicular to the second direction D2, and the data line and the scan line are isolatedly crossed with each other and define a pixel area. In the following description, the illustrated details of the projected line 21P, the conductive wire 21 and the light-shielding pattern 13 are substantially positioned in the region between two adjacent pixel areas.

It is noted that although a color filter substrate including the color resists is exemplified as the first substrate 10 of the embodiment, the disclosure is not limited thereto. The disclosure can be applied to the type of LCD with the second substrate 20 having the color resists and the conductive wires, such as COA (Color Filter on Array) LCD.

Additionally, although the curving tendency of the data line to that of the light-shielding pattern is illustrated for describing the embodiment, the disclosure is not limited thereto. The disclosure can be applied to other conductive layers (such as ITO) without departing from the design spirit of the disclosure. Also, the accompany drawings are simplified, on the basis of knowledge of the person skilled in the relevant art, to show the related components for clear illustrations of the embodiment.

Figure 8:
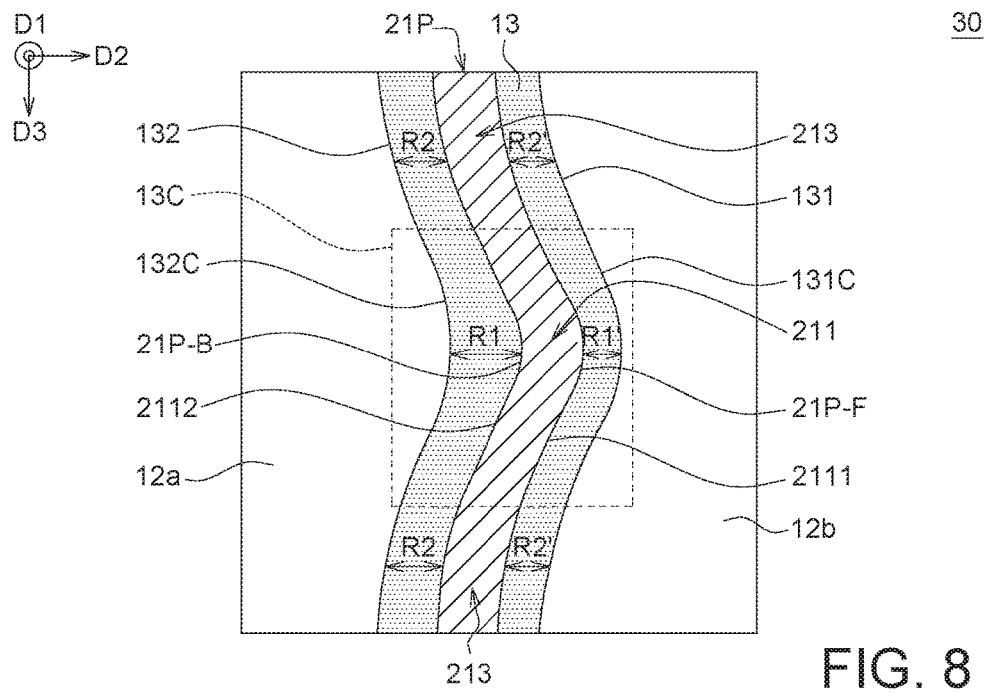
FIG. 8 is an enlarged view of a curved portion in the circled area 30 of FIG. 6.

FIG. 8 is an enlarged view of a curved portion in the circled area 30 of FIG. 6. In one embodiment, the conductive wire 21 is projected onto the light-shielding pattern 13 along the first direction D1 to obtain the projected line 21P within the light-shielding pattern 13. The projected line 21P of the conductive wire 21 comprises a curved portion 211 and two extending portions 213 respectively connected to two ends of the curved portion 211, wherein the concave border 2112 (i.e. the curving-inward side 21P-B) of the curved portion 211 is more gentle than the convex border 2111 (i.e. the curving-outward side 21P-F). For example, the concave border 2112 and the convex border 2111 are a smooth curve and a sharp curve, respectively. Please refer to FIG. 6. In one embodiment, if a length of a projected line is defined as the distance between the first san line SL1 and the second scan line SL2, the projected line can be divided into seven equal parts, and the middle part is corresponding to the position of the curved portion 211 while the other six parts are corresponding to the two extending portions 213.

In one embodiment, the edge of the light-shielding pattern 13 comprises a first edge 131 adjacent to the curving-outward side 21P-F (the convex border 2111) and a second edge 132 adjacent to the curving-inward side 21P-B (concave border 2112), and the projected line 21P of the conductive wire 21 is positioned between the first edge 131 and the second edge 132 of the light-shielding pattern 13. As shown in FIG. 8, a distance between the first edge 131 of the light-shielding pattern 13 and the curved portion 211 of the projected line 21P along the second direction D2, such as the distance R1', is not equal to a distance between the first edge 131 of the light-shielding pattern 13 and one of the extending portions 213 along the second direction D2, such as the distance R2'. Similarly, a distance between the second edge 132 of the light-shielding pattern 13 and the curved portion 211 of the projected line 21P along the second direction D2, such as the distance R1, is not equal to a distance between the second edge 132 of the light-shielding pattern 13 and one of the extending portions 213 along the second direction D2, such as the distance R2. The first direction D1 is perpendicular to the second direction D2. In one embodiment, the second direction D2 is substantially perpendicular to the third direction D3.

According to the embodiment, the distance can be defined as the meaning expressed below. The distance between the first edge 131 and the curved portion 211 of the projected line 21P along the second direction D2 is referred to a distance between the first edge 131 and a convex point of the curved portion 211 along the second direction D2. The convex point is at the convex border 2111 of the curved portion 211, and a tangent of the convex border 2111 at the convex point is parallel to the third direction D3. Similarly, the distance between the second edge 132 and the curved portion 211 of the projected line 21P along the second direction D2 is referred to a distance between the second edge 132 and a concave point of the curved portion 211 along the second direction D2. The concave point is at the concave border 2112 of the curved portion 211, and a tangent of the concave border 2112 at the concave point is parallel to the third direction D3. Also, the distance between the first edge 131 and one of the extending portions 213 along the second direction D2 is referred to a distance between a point of the first edge 131 and the extending portion 213 along the second direction D2. The distance between the second edge 132 and one of the extending portions 213 along the second direction D2 is referred to a distance between a point of the second edge 132 and the extending portion 213 along the second direction D2.

In one embodiment, there is a distance R1' between the first edge 131 of the light-shielding pattern 13 and the curved portion 211 of the projected line 21P along the second direction D2, and a distance R2' is determined between the first edge 131 of the light-shielding pattern 13 and the extending portion 213 along the second direction D2, wherein the distance R1' is shorter than the distance R2' (R1'<R2').

In one embodiment, a distance R1 is determined between the second edge 132 of the light-shielding pattern 13 and the curved portion 211 of the projected line 21P along the second direction D2, and a distance R2 is determined between the second edge 132 of the light-shielding pattern 13 and the extending portion 213 along the second direction D2, wherein the distance R1 is larger than the distance R2 (R1>R2).

In one embodiment, the distance R1' between the first edge 131 of the light-shielding pattern 13 and the curved portion 211 of the projected line 21P along the second direction D2 is shorter than the distance R1 between the second edge 132 and the curved portion 211 along the second direction D2.

Also, as shown in FIG. 8, the light-shielding pattern 13 comprises a light-shielding curving portion 13C corresponding to the curved portion 211 of the projected line 21P. The first edge 131 comprises a first curving rim 131C while the second edge 132 comprises a second curving rim 132C, and the light-shielding curving portion 13C is positioned between the first curving rim and the second curving rim. In the embodiment, the curving tendency of the first curving rim 131C is larger than the curving tendency of the second curving rim 132C.

Additionally, as shown in FIG. 8, the curved portion 211 of the projected line 21P has a convex border 2111 and a concave border 2112 opposite to the convex border 2111. The curving tendency of the convex border 2111 can be larger than the curving tendency of the concave border 2112. In other words, the curved portion of the conductive wire 21 can be configured as a design with the pointed front and the less-arched back. However, the disclosure is not limited thereto.

Also, compared the light-shielding pattern 13 and the conductive wire 21, a curving tendency of the light-shielding curving portion 13C of the light-shielding pattern 13 is smaller than a curving tendency of the curved portion 211 of the projected line 21P of the conductive wire 21, as shown in FIG. 6 and FIG. 8.

Moreover, the comparison of the curving tendency of the light-shielding curving portion 13C of the light-shielding pattern 13 to the curving tendency of the curved portion 211 of the projected line 21P of the conductive wire 21 can be made by observing the related radiuses of curvature.

Figure 9:
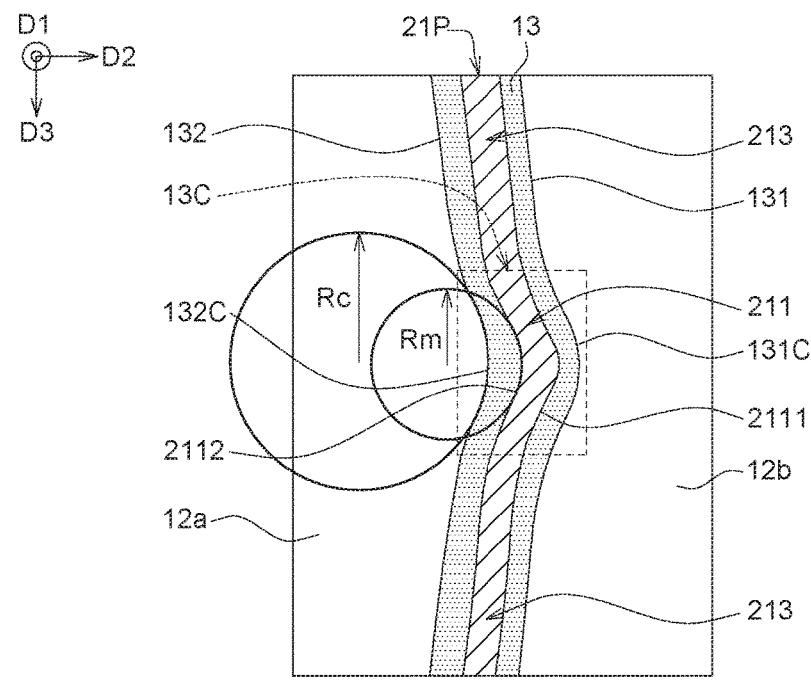
FIG. 9 is an enlarged view of a light-shielding pattern and a projected line of the conductive wire according to an embodiment of the disclosure.

FIG. 9 is an enlarged view of a light-shielding pattern and a projected line of the conductive wire according to an embodiment of the disclosure. The related radiuses of curvature of the light-shielding pattern and the projected line are also labeled in FIG. 9. Identical elements of FIG. 9 and FIG. 8 are designed with the same reference numbers, and the details have been described above and not redundantly described herein. As shown in FIG. 9, the light-shielding pattern 13 comprises the light-shielding curving portion 13C, and a rim of the light-shielding curving portion 13C has a smallest radius of curvature Rc, while a rim of the curved portion 211 of the projected line 21P has a smallest radius of curvature Rm. In one embodiment, the smallest radius of curvature Rc of the rim of the light-shielding curving portion 13C is larger than the smallest radius of curvature Rm of the rim of the curved portion 211 of the projected line 21P (Rc>Rm).

Figure 10:
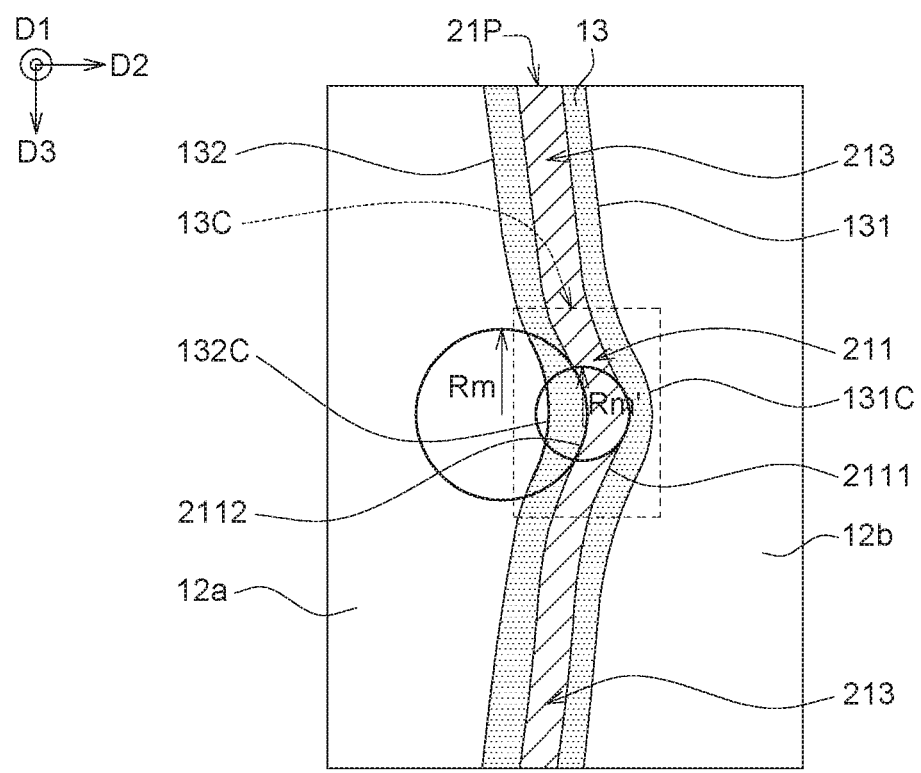
FIG. 10 is another enlarged view of a light-shielding pattern and a projected line of the conductive wire according to an embodiment of the disclosure.

FIG. 10 is another enlarged view of a light-shielding pattern and a projected line of the conductive wire according to an embodiment of the disclosure. Two related radiuses of curvature of the curved portion of the projected line are also labeled in FIG. 10. In one embodiment, the convex border 2111 of the curved portion 211 of the projected line 21P is configured substantially as a first arc, and the concave border 2112 of the curved portion 211 of the projected line 21P is configured substantially as a second arc. As shown in FIG. 10, a radius of curvature Rm' of the first arc is smaller than a radius of curvature Rm of the second arc.

The descriptions above discuss the structures of the light-shielding pattern 13 and the projected line 21P of the conductive wire 21 of the embodiment. In the application of the LCD having the first substrate comprising color resists (i.e. CF substrate), the conductive wire 21 is also correspondingly positioned between two adjacent color resists. As shown in FIG. 6 and FIG. 8, the first substrate 10 comprises a first color resist (ex: green color resist) 12a and a second color resist (ex: red color resist) 12b, and the projected line 21P of the conductive wire 21 is positioned between the first color resist 12a and the second color resist 12b. In the following description, the edge of the color resist is referred to a boundary between the color resist and the light-shielding pattern, which can be observed from the back side of a substrate of a display using an optical microscope.

In one embodiment, a distance between an edge of the second color resist 12b and the curved portion 211 of the projected line 21P along the second direction D2, such as the distance R1', is shorter than a distance between an edge of the first color resist 12a and the curved portion 211 of the projected line 21P along the second direction D2, such as the distance R1 (R1'<R1, FIG. 8).

In one embodiment, a distance between an edge of the first color resist 12a and one of the extending portions 213 of the projected line 21P along the second direction D2, such as the distance R2, is shorter than a distance between the edge of the first color resist 12a and the curved portion 211 of the projected line 21P along the second direction D2, such as the distance R1 (R2<R1, FIG. 8).

In one embodiment, a distance between an edge of the second color resist 12b and one of the extending portions 213 of the projected line 21P along the second direction D2, such as the distance R2', is larger than a distance between the edge of the second color resist 12b and the curved portion 211 of the projected line 21P along the second direction D2, such as the distance R1' (R2'>R1', FIG. 8).

According to the embodiment, the distance can be defined as the meaning expressed below. The distance between the edge of the second color resist 12b and the curved portion 211 of the projected line 21P along the second direction D2 is referred to a distance between the edge of the second color resist 12b and a convex point of the curved portion 211 along the second direction D2. The convex point is at the convex border 2111 of the curved portion 211, and a tangent of the convex border 2111 at the convex point is parallel to the third direction D3. Similarly, the distance between the edge of the first color resist 12a and the curved portion 211 of the projected line 21P along the second direction D2 is referred to a distance between the edge of the first color resist 12a and a concave point of the curved portion 211 along the second direction D2. The concave point is at the concave border 2112 of the curved portion 211, and a tangent of the concave border 2112 at the concave point is parallel to the third direction D3. Also, the distance between the edge of the second color resist 12b and one of the extending portions 213 along the second direction D2 is referred to a distance between a point of the edge of the second color resist 12b and the extending portion 213 along the second direction D2. The distance between the edge of the first color resist 12a and one of the extending portions 213 along the second direction D2 is referred to a distance between a point of the edge of the first color resist 12a and the extending portion 213 along the second direction D2.

Moreover, related radiuses of curvature can be observed. As shown in FIG. 9, an edge of the first color resist 12a adjacent to the curved portion 211 of the projected line 21P has a smallest radius of curvature Rc, and a rim of the curved portion 211 of the projected line 21P adjacent to the first color resist 12a has a smallest radius of curvature Rm. In one embodiment, the smallest radius of curvature Rm of the rim of the curved portion 211 is smaller than the smallest radius of curvature Rc of an edge of the first color resist 12a (Rm<Rc).

According to the embodiments, a curved portion of the conductive wire 21 is configured to have an inward side with more gentle curvature. As shown in FIG. 8, the curved portion 211 of the projected line 21P of the conductive wire 21 within the light-shielding pattern 13 comprises the convex border 2111 and the concave border 2112, wherein the concave border 2112 (i.e. the curving-inward side 21P-B) of the curved portion 211 is more gentle than the convex border 2111 (i.e. the curving-outward side 21P-F), so as to present a design with the pointed convex border 2111 (with a radius of curvature Rm') and the less-arched concave border 2112 (with a radius of curvature Rm, wherein Rm'<Rm).

According to the aforementioned description, the LCD of the embodiment comprises the conductive wires and the light-shielding pattern 13 having corresponding curved portions with different curving tendencies. In one embodiment, one side of the curved portion of the conductive wire is less curved than the opposite side; for example, the back side of the curved portion of the conductive wire is an arc with a larger radius of curvature (i.e. less-arched).

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a first substrate;
   a second substrate comprising a conductive wire;
   a display medium layer, disposed between the first substrate and the second substrate; and
   a light-shielding pattern, disposed between the first substrate and the second substrate;
   wherein the conductive wire is projected onto the light-shielding pattern along a first direction to obtain a projected line within the light-shielding pattern, and the projected line comprises a first border;
   wherein the light-shielding pattern comprises a first edge, the first edge comprises a first curving rim and a first non-curving rim adjacent to the first curving rim, and the first curving rim is adjacent to the first border, a distance between the first curving rim and the first border along a second direction is larger than a distance between the first non-curving rim and the first border along the second direction, the second direction is different from the first direction.

2. The display device according to claim 1, wherein the light-shielding pattern further comprises a second edge opposing to the first edge, the second edge comprises a second curving rim opposing to the first curving rim, a curving tendency of the second curving rim is different from a curving tendency of the first curving rim.

3. The display device according to claim 2, wherein the curving tendency of the second curving rim is larger than the curving tendency of the first curving rim.

4. The display device according to claim 2, wherein the projected line further comprises a second border opposing to the first border, wherein a distance between the second border and the second curving rim along the second direction is smaller than the distance between the first border and the first curving rim along the second direction.

5. The display device according to claim 4, wherein the second border is a convex border, and the first border is concave border.

6. The display device according to claim 1, wherein
   the projected line further comprises a second border opposing to the first border,
   the light-shielding pattern further comprises a second edge opposing to the first edge, the second edge comprises a second curving rim and a second non-curving rim adjacent to the second curving rim,
   a distance between the second curving rim and the second border along the second direction is different from a distance between the first non-curving rim and the second border along the second direction.

7. The display device according to claim 6, wherein the distance between the second curving rim and the second border along the second direction is shorter than the distance between the first non-curving rim and the second border along the second direction.

\* \* \* \* \*